(12) United States Patent
Marin

(10) Patent No.: US 11,857,469 B2
(45) Date of Patent: Jan. 2, 2024

(54) DEVICE FOR TRANSPORTING A COFFIN

(71) Applicants: Adrian Jonel Marin, Bra (IT); Viviana Muo', Turin (IT)

(72) Inventor: Adrian Jonel Marin, Bra (IT)

( * ) Notice: Subject to any disclaimer, the term of this patent is extended or adjusted under 35 U.S.C. 154(b) by 198 days.

(21) Appl. No.: 17/434,552

(22) PCT Filed: Feb. 28, 2020

(86) PCT No.: PCT/IT2020/000027
§ 371 (c)(1),
(2) Date: Aug. 27, 2021

(87) PCT Pub. No.: WO2020/178868
PCT Pub. Date: Sep. 10, 2020

(65) Prior Publication Data
US 2022/0125659 A1    Apr. 28, 2022

(30) Foreign Application Priority Data

Mar. 1, 2019   (IT) .................. 102019000002921

(51) Int. Cl.
*A61G 19/00* (2006.01)
*B65G 7/12* (2006.01)
*A61G 17/04* (2006.01)

(52) U.S. Cl.
CPC ............ *A61G 19/00* (2013.01); *A61G 17/041* (2016.11); *B65G 7/12* (2013.01)

(58) Field of Classification Search
CPC ...... A61G 19/00; A61G 17/041; A61G 17/04; B65G 7/12; Y10T 16/501; Y10T 16/4701
USPC ........................................ 27/27; 16/424, 439
See application file for complete search history.

(56) References Cited

U.S. PATENT DOCUMENTS

| | | | | |
|---|---|---|---|---|
| 737,580 | A * | 9/1903 | Carpenter | A61G 17/041 27/27 |
| 878,985 | A * | 2/1908 | Montross | A61G 17/041 D99/7 |
| 937,086 | A * | 10/1909 | Montross | A61G 17/041 27/27 |
| 1,292,268 | A | 1/1919 | Camp | |
| 1,468,111 | A | 9/1923 | Edgar | |
| 2,198,997 | A * | 4/1940 | Hickey | A61G 17/041 27/27 |
| 2,802,253 | A * | 8/1957 | Birck | A61G 19/00 27/27 |
| D218,890 | S * | 10/1970 | Kreminski | D99/8 |

(Continued)

FOREIGN PATENT DOCUMENTS

| | | |
|---|---|---|
| CA | 2139271 A1 | 4/1996 |
| DE | 4214932 A1 | 11/1992 |

OTHER PUBLICATIONS

International Search Report, International App. No. PCT/IT2020/000027, dated Sep. 11, 2020, 4 Pages.

(Continued)

*Primary Examiner* — William L Miller
(74) *Attorney, Agent, or Firm* — Vorys, Sater, Seymour and Pease LLP; Khaled Shami

(57) ABSTRACT

A device for transporting a coffin is described, composed of a supporting frame approximately covered by the coffin, comprising a plurality of sliding shelves (1, 2) used to increase the extension of the supporting frame with respect to the area covered by the coffin.

9 Claims, 6 Drawing Sheets

(56) References Cited

U.S. PATENT DOCUMENTS

| | | | | |
|---|---|---|---|---|
| 4,017,947 A | * | 4/1977 | Acton | A61G 17/041 27/27 |
| 4,315,354 A | * | 2/1982 | Behrendt | A61G 19/00 27/27 |
| D329,317 S | * | 9/1992 | Bell, Jr. | D99/8 |
| 5,226,688 A | * | 7/1993 | Russo | B65G 7/12 294/16 |
| 5,522,116 A | * | 6/1996 | Enneking | B65G 7/12 27/27 |
| 5,531,000 A | * | 7/1996 | Biondo | A61G 17/041 27/27 |
| 5,586,376 A | * | 12/1996 | Enneking | A61G 19/00 27/27 |
| 5,901,862 A | | 5/1999 | Riga et al. | |
| 8,918,969 B2 | * | 12/2014 | Jenson | A61G 19/00 27/27 |
| 9,889,057 B1 | | 2/2018 | Womack | |

OTHER PUBLICATIONS

Written Opinion of the International Searching Authority, International App. No. PCT/IT2020/000027, dated Sep. 11, 2020, 4 Pages.

\* cited by examiner

DEVICE FOR TRANSPORTING A COFFIN

TECHNICAL FIELD

The present invention refers to a device for transporting a coffin.

In general, the present invention refers to hoods, funeral envelopes, funeral urns.

In particular, the present invention refers to a lifting or lowering devices for coffins, a removable handle for coffer, handling systems through handles or other mechanical means.

BACKGROUND

The prior art is given by U.S. Pat. No. 8,918,969B2, dealing with a support to enable the transport of a funeral container having a bottom surface, a plurality of side surfaces and an upper surface. The support includes a basic element having a generally rather long length to cover the width of the funeral container and an upper surface sized and configured for receiving the lower surface of the funeral container. A vertical member has a lower end coupled with the basic element and an upper end. The projecting element extends in a generally perpendicular plane to the basic element.

A member is provided for the handle which is coupled with the straight member. The handle includes a receiving surface for a hand which can be grasped by a user's hand.

Moreover, the prior art is given by U.S. Pat. No. 4,017,947, dealing with a coffin, with a groove extending around it, next to its bottom and being completely lacking handles. A transporting device s provided, to be engaged in the groove when applied thereto, the transport device being easily dismountable for its re-use.

Moreover, the prior art is given by U.S. Pat. No. 9,889,057B1, dealing with a retractable handle system for a coffin. A coffin with disappearing handles includes a box with a hood-type cover openly coupled thereto. A base coupled with the box comprises a panel whose length and width are similar to length and width of the box. Spacers are coupled with the panel to form channels. Arms are sliding positioned in the channels. At least four bars are coupled with the arms. The bars can have ends angled by 45°, which allow the bars to adhere one to the other when they are in a closed position, making them not appear any more as handles on the coffer box. By sliding the arms, the bars move from the closed position to the open position.

The invention of U.S. Pat. No. 8,918,969B2 solves the problem of regulating the position of the handles depending on the need of the operators responsible for transporting the coffin. However, the used device modifies the overall sizes and the aesthetics of the coffin.

The invention of U.S. Pat. No. 4,017,947 solves the problem of transporting a coffin equipped with a lower groove which allows an easy hold for a removable device. For this reason, the invention of U.S. Pat. No. 4,017,947 could be the most relevant prior art to solve the technical problem of having to transport a coffin improving safety and stability conditions.

The invention of U.S. Pat. No. 9,889,057B1 solves the problem of making the supporting means disappear when not used.

OVERVIEW

Object of the present invention is providing a device which facilitates the transport of a coffin improving its stability and safety for an operator.

A further object is providing a device for transporting a coffin of a retractable type, in order not to change the atmosphere of concentration during a funeral.

A further object is providing a device for transporting a coffin whose configuration can be quickly modified, depending on the number of operators responsible for its transport.

A further object is providing a device for transporting a coffin which can be used through widely used components and industrial diffusion to reduce its production costs.

A further object is providing a device for transporting a coffin which can be easily assembled and transported.

The above and other objects and advantages of the invention, as will result from the following description, are obtained with a device for transporting a coffin. Preferred embodiments and non-trivial variations of the present invention are the subject matter of the dependent claims.

It is intended that all enclosed claims are an integral part of the present description.

It will be immediately obvious that numerous variations and modifications (for example related to shape, sizes, arrangements and parts with equivalent functionality) can be made to what is described, without departing from the scope of the invention, as disclosed in the enclosed claims.

BRIEF DESCRIPTION OF THE DRAWINGS

The present invention will be better described by some preferred embodiments thereof, provided as a non-limiting example, with reference to the enclosed drawings, in which.

DESCRIPTION OF EXAMPLE EMBODIMENTS

Figure 1:
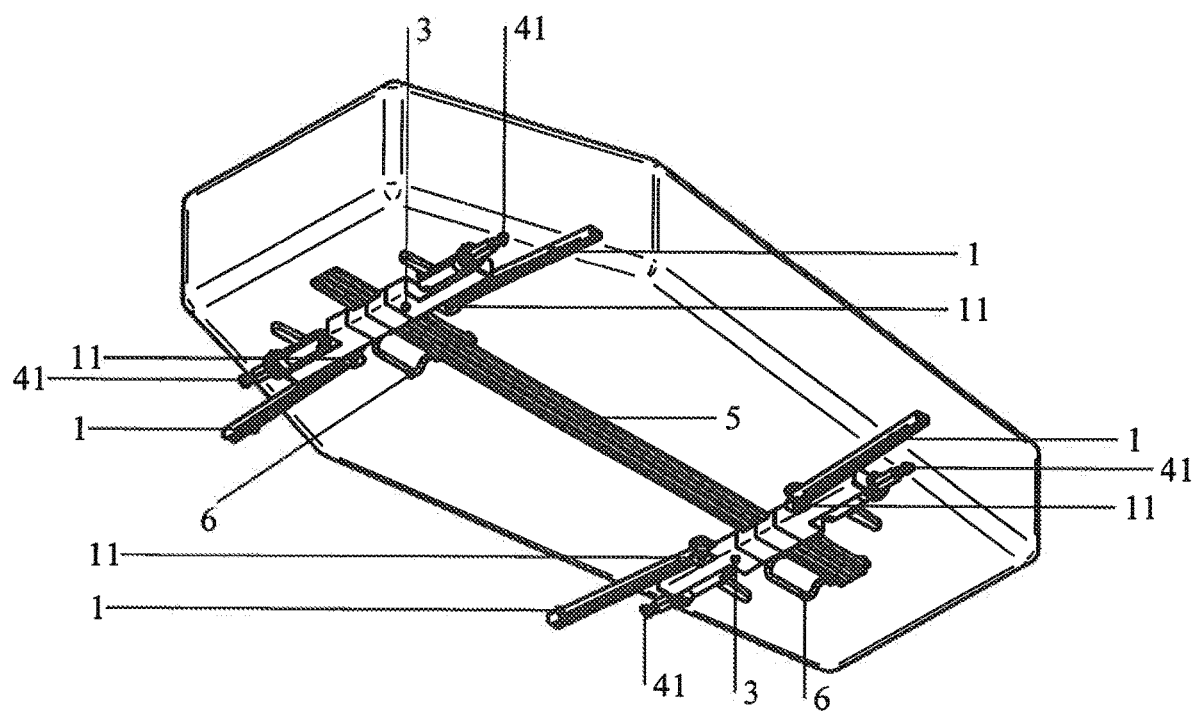
FIG. 1 shows an axonometric view of a device associated with a coffin of an embodiment of the device for transporting a coffin according to the present invention.
Figure 2:
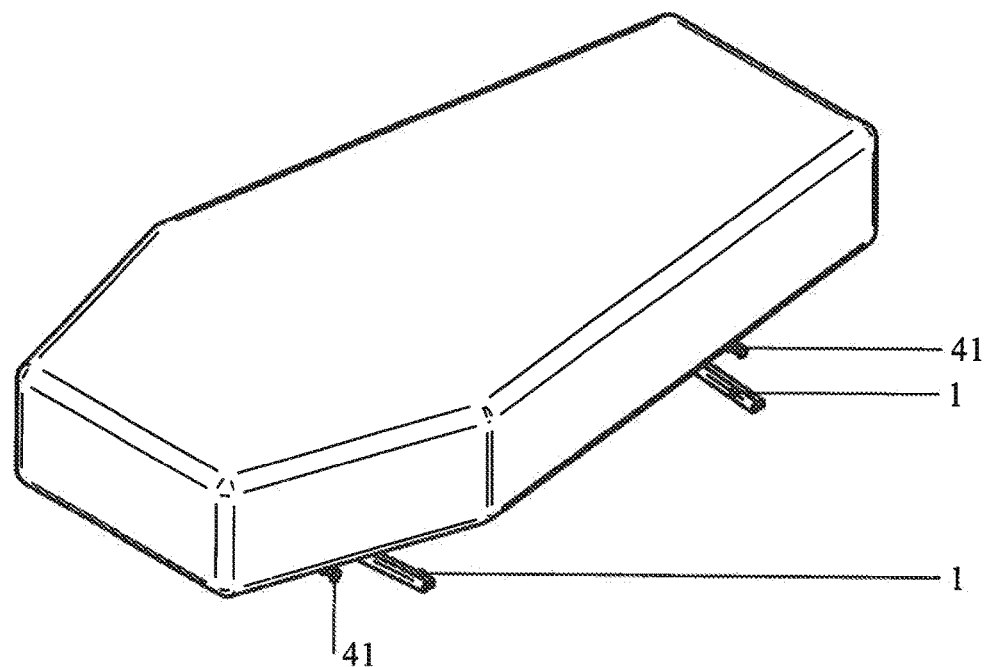
FIG. 2 shows a further axonometric view associated with the previous Figure.
Figure 4:
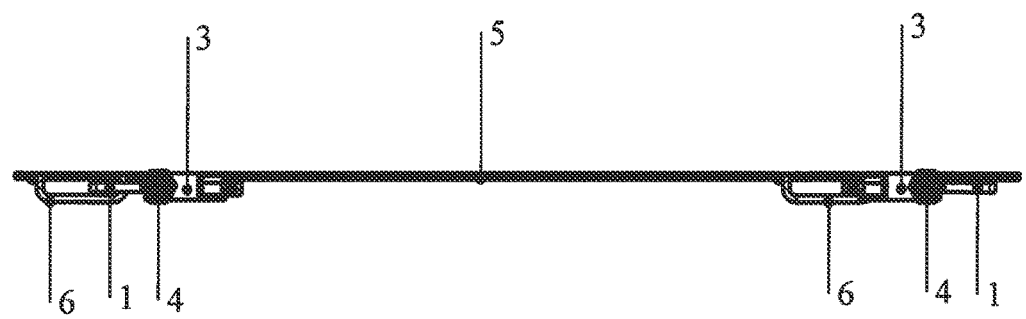
FIG. 4 shows a side view associated with the previous Figure.

With reference to FIGS. 1 and 2, it is possible to note that a device for transporting a coffin is composed of a supporting frame approximately covered by the coffin.

Advantageously, the device according to the present invention comprises a plurality of sliding shelves 1, 2, each of such sliding shelves 1, 2 being designed to increase the extension of the supporting frame with respect to the area covered by the coffin.

Figure 3:
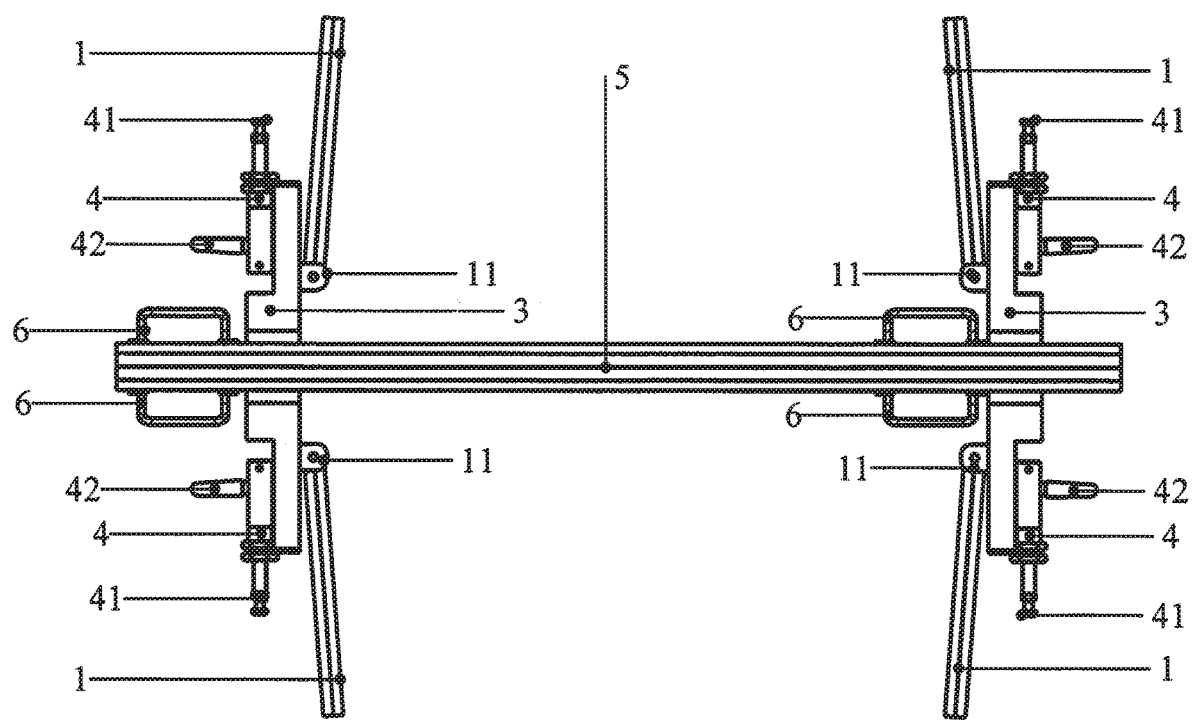
FIG. 3 shows a plan view of an embodiment of the device for transporting a coffin according to the present invention.
Figure 5:
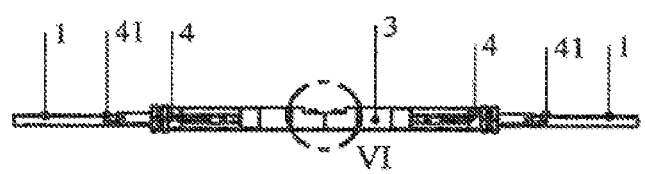
FIG. 5 shows a front view associated with the previous Figure.
Figure 7:
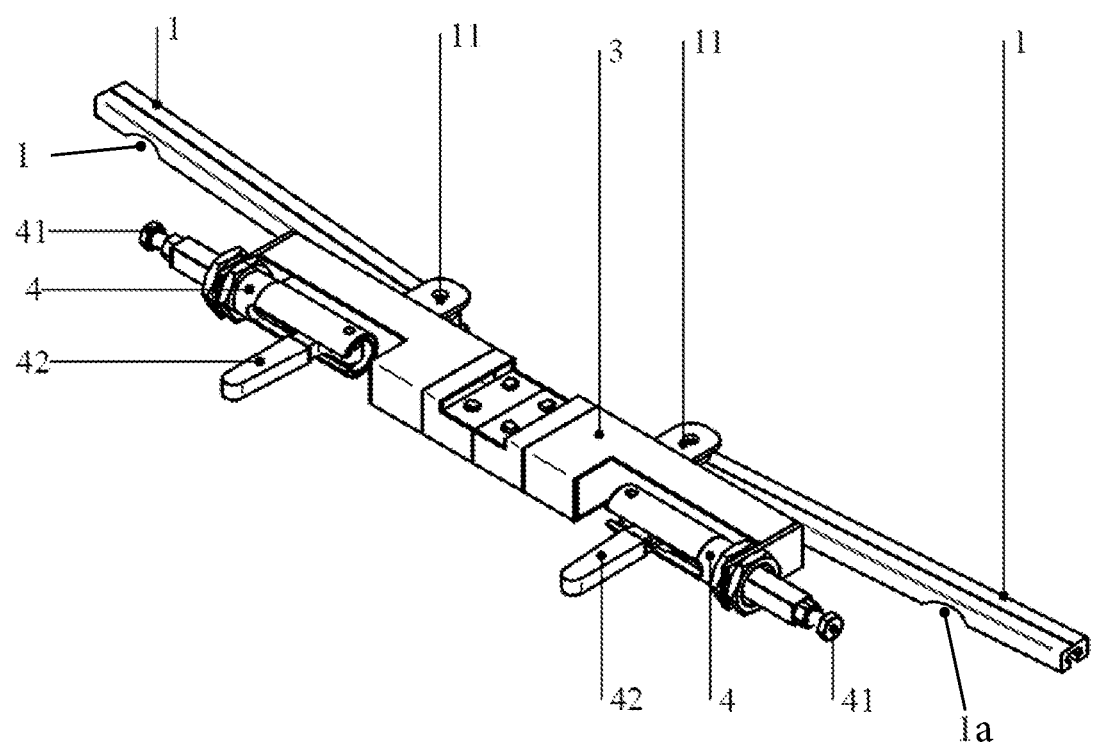
FIG. 7 shows an axonometric view of a meaningful part of an embodiment of the device for transporting a coffin according to the present invention.
Figure 8:
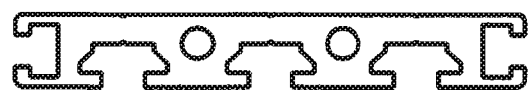
FIG. 8 shows a front view of a meaningful part of an embodiment of the device for transporting a coffin according to the present invention.
Figure 9:
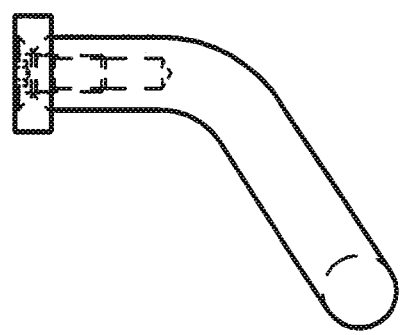
FIG. 9 shows a front view of a further meaningful part of an embodiment of the device for transporting a coffin according to the present invention.
Figure 10:
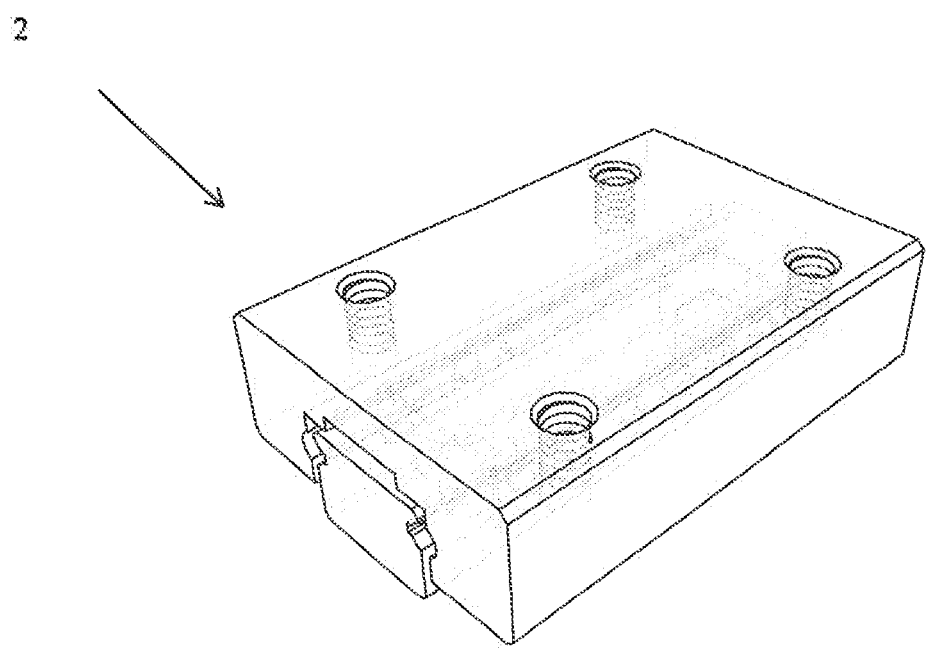
FIG. 10 shows an axonometric view of a meaningful part used as variation of an embodiment of the device for transporting a coffin according to the present invention.

With reference to FIGS. 1, 3 and 7, it is possible to note that each of the sliding shelves 1 is connected to the supporting frame through a hinge 11 to be able to rotate inside and outside. In the same way, each of the sliding shelves 2 is connected to the supporting frame through a linear guide to be able to slide inside and outside (as shown, for example, in FIG. 10).

Each of the sliding shelves 1, 2, comprises a concavity 1a to enable the interaction with the shoulder of an operator.

Each of the sliding shelves 1, 2 comprises at 10 least one portion of a layer of deformable material, not shown, to improve the distribution of the load on an operator.

With reference to FIGS. 1 and from 3 to 6, it is possible to note that the supporting frame comprises a plurality of transverse rods 3 approximately along the width direction of the coffin, to support each of the sliding shelves 1, 2.

Each of the transverse rods 3 is equipped with a clamp 4 in order to fasten and lock the coffin. The clamp 4 comprises a sliding rod 41 with a lever 42 for a quick locking. The end of such sliding rod 41 is shaped as an hook or anyway of another type of catching element, which can adhere with safety to the surface of the coffin The supporting frame comprises at least one longitudinal rod 5 connected to the plurality of transverse rods 3 through mechanical interface means with permanent locking systems or quick locking/unlocking systems (as shown, for example, in FIG. 6).

Such at least one longitudinal rod 5 is equipped with handles 6 of a removable type or permanently fastened, and with a locking system comprising the clamp 4 to fasten and lock the coffin longitudinally.

The device can be completely detachable from the coffin once having ended its use.

The device for transporting a coffin comprises transverse rods equipped with clamps to fasten and lock the coffin. Each of such clamps comprises a sliding rod with a lever for their quick locking. The end of such sliding rod can be shaped as a hook or anyway of another type of catching element, which can adhere with safety to the surface of the coffin.

A variation provides that the sliding rod 41 is connected to the transverse rod 3 through a recall spring (not shown).

Figure 6:
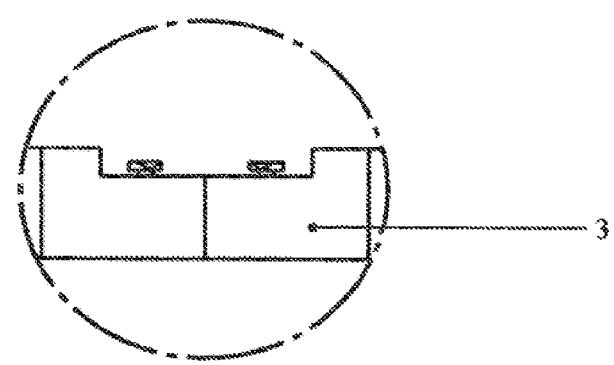
FIG. 6 shows an enlarged part VI of the previous Figure.

The longitudinal rod is connected to the plurality of transverse rods through mechanical interface means with permanent locking systems or quick locking/unlocking systems, such as screws with a projecting shaped head, shown in FIG. 6.

Both the transverse rods and the handles are applied to the longitudinal rod, making them slide till a suitable and more comfortable position for an operator. It is possible to increase the number of the operator stations by simply adding or removing a transverse rod and a pair of handles sliding along the longitudinal axis.

Alternatively, the ends of the longitudinal rod can house a locking system equipped with a holding hook to block head and feet of the coffin.

In this way, the device is fastened to the coffin not only transversally, but also longitudinally, allowing oscillations in pitch and roll safety when handling the coffin, for example along a staircase of a building or of a religious place.

The device of the invention is made with mechanical elements and parts of a commercial type. For example, it is possible to use the following bill of industrial materials:

Handles with plate/Offset, UHFNEAG125-S;
Recess width 6 mm/plane aluminum profiles, HFSQN4-1070-1500;
Recess width 10 mm/plane aluminum profiles/1 recess, HFSPURE8-1830-400;
profiles/Rectangular tubes, HFHQ4080-2-450;
Push-Pull, MC07-15.

The invention claimed is:

1. Device for transporting a coffin, composed of a supporting frame approximately covered by the coffin, comprising a plurality of sliding shelves, each of said sliding shelves being designed to increase an extension of the supporting frame with respect to an area covered by the coffin, characterized in that each of said sliding shelves comprises a concavity to enable an interaction with a shoulder of an operator.

2. Device according to the claim 1, characterized in that each of said sliding shelves is connected to the supporting frame through a hinge to be able to rotate inside and outside.

3. Device according to claim 1, characterized in that each of said sliding shelves is connected to the supporting frame through a linear guide to be able to slide inside and outside.

4. Device according to claim 1, characterized in that each of said sliding shelves comprises at least one portion of a layer of deformable material to improve the distribution of the load on the operator.

5. Device according to claim 1, characterized in that the supporting frame comprises a plurality of transverse rods approximately along a width direction of the coffin, to support each of said sliding shelves, each of said transverse rods being equipped with a clamp in order to fasten and lock the coffin.

6. Device according to the claim 5, characterized in that said clamp comprises a sliding rod with a lever for quick locking, ends of said sliding rod being shaped as a hook or other means to safely adhere to a surface of the coffin.

7. Device according to claim 5, characterized in that the supporting frame comprises at least one longitudinal rod connected to said plurality of transverse rods through mechanical interface means with permanent locking systems or quick locking/unlocking systems.

8. Device according to the claim 7, characterized in that said at least one longitudinal rod is equipped with handles which are removable or permanently fastened and of a locking system comprising said clamp of said transverse rod to fasten and lock the coffin longitudinally.

9. Device according to claim 1, characterized in that said supporting frame is completely detachable from the coffin.

* * * * *